United States Patent
Amirijoo

Patent Number: 6,119,012
Date of Patent: Sep. 12, 2000

[54] METHOD AND SYSTEM FOR DYNAMICALLY AND PERIODICALLY UPDATING MOBILE STATION LOCATION DATA IN A TELECOMMUNICATIONS NETWORK

[75] Inventor: Shahrokh Amirijoo, Richardson, Tex.

[73] Assignee: Ericsson Inc., Richardson, Tex.

[21] Appl. No.: 09/191,334

[22] Filed: Nov. 13, 1998

[51] Int. Cl.$^7$ ...................................................... H04Q 7/20

[52] U.S. Cl. ........................ 455/456; 455/453; 455/458; 455/432; 455/435

[58] Field of Search .................................. 455/422, 432, 455/433, 43, 435, 453, 456, 458

[56] References Cited

U.S. PATENT DOCUMENTS

| | | | |
|---|---|---|---|
| 4,670,899 | 6/1987 | Brody et al. | 455/453 |
| 5,097,499 | 3/1992 | Cosentino | 455/435 |
| 5,303,297 | 4/1994 | Hillis | 455/406 |
| 5,305,466 | 4/1994 | Taketsugu | 455/435 |
| 5,732,350 | 3/1998 | Marko et al. | 455/435 |
| 5,805,993 | 9/1998 | Cherpantier et al. | 455/422 |
| 5,832,381 | 11/1998 | Kauppi | 455/432 |
| 5,943,621 | 8/1999 | Ho et al. | 455/456 |
| 5,946,619 | 8/1999 | Kolev | 455/432 |
| 5,970,403 | 10/1999 | Alperovich et al. | 455/406 |
| 5,983,102 | 11/1999 | Gozes | 455/432 |

OTHER PUBLICATIONS

General Packet Radio Services(GPRS)—*always connected, always online* LKG/X–98:0002, Rev C, May 2, 1998.

*Primary Examiner*—Nguyen Vo
*Assistant Examiner*—Charles N. Appiah
*Attorney, Agent, or Firm*—Kermit D. Lopez

[57] ABSTRACT

A method and system in a telecommunications network for dynamically updating data indicative of the availability of mobile stations within the telecommunications network. Periodically, a total number of mobile location updates and a total number of failed pagings occurring within the telecommunications network during a prior time interval are ascertained. Thereafter, a ratio of the total number of mobile location updates to the total number of failed pagings is determined, in response to ascertaining the total number of mobile location updates and the total number of successful paging occurring within the prior time interval. A threshold value is designated such that the threshold value is determinative of whether or not to release to the telecommunications network, data indicative of the availability of mobile stations within the telecommunications network. At a particular time, the data is automatically released, in response to ascertaining whether the ratio falls within an appropriate range of the threshold value. The use of the threshold value to assist in determining whether or not to release the data to the telecommunications network at a particular time, promotes the dynamic release of the data to the telecommunications network without the necessity of manual intervention.

24 Claims, 5 Drawing Sheets

METHOD AND SYSTEM FOR DYNAMICALLY AND PERIODICALLY UPDATING MOBILE STATION LOCATION DATA IN A TELECOMMUNICATIONS NETWORK

BACKGROUND OF THE INVENTION

1. Technical Field of the Invention

The present invention is related to an improved telecommunications network. In particular, the present invention relates to wireless telecommunications networks. More particularly, the present invention relates to cellular telephone networks. Still more particularly, the present invention relates to techniques for periodically notifying a telecommunications network of the availability of mobile stations within the telecommunications network.

2. Description of the Related Art

Present-day mobile telephony has spurred rapid technological advances in both wireless and non-wireless areas. The telecommunications industry is a rapidly growing industry, with advances, improvements, and technological breakthroughs occurring on an almost daily basis. Many mobile telecommunications systems, among them the European GSM-system, have already passed through several basic development phases and system designers are now concentrating on further improvements to the systems, including system refinements and the introduction of optional services.

Most wireless telecommunication systems currently in use are implemented as cellular telephone networks. Cellular telephone networks typically are composed of a group of base stations connected to a centrally located switch. This centrally located switch is commonly referred to as a Mobile Switching Center (MSC). Base stations are usually spaced apart from each other by distances of between one-half and twenty kilometers. Each base station is assigned a number of two-way voice and control channels. The voice channels transmit voice signals to and from proximately located mobile stations, and transmit control information to and from these mobile stations, usually for the purpose of establishing a voice communications link.

A typical cellular telephone network also includes a group of interconnected mobile switching centers, which operate in association with a gateway mobile switching center through which the cellular telephone network interconnects with a conventional public switched telephone network (PSTN). In addition, at least one home location register (HLR) operates within the cellular telephone network. The HLR stores network subscriber information, including the identified location of current mobile stations within the network.

In response to an incoming call dialed to a mobile station, a signal is sent to the home location register requesting routing information through the network to the called mobile station. The home location register "looks up" the current location of the mobile station and contacts the currently serving mobile switching center to pre-route the call and retrieve a temporary location directory number, which is utilized to route the call through the cellular telephone network for delivery to the mobile station. The serving mobile switching center retrieves from a visitor location register (VLR), the identification of the cell within which the called mobile station is currently located. The mobile switching center then instructs the base station associated with that particular cell to page the mobile station. Responding to the page, the mobile station requests assignment of a channel, and the network routes the call through the serving mobile switching center and over the assigned channel.

Periodic updating, a well-known telecommunications technique, is a technique utilized in GSM-type telecommunications networks to periodically notify the network of the availability of mobile stations within the telecommunications network. Periodic updating may be accomplished utilizing location updating or routing area update procedures. Timers located at Mobile Stations within the network control the timing of such procedures. In a GSM-type telecommunications network, such timers may be located at an MSC. In a General Packet Radio Services (GPRS) telecommunications system, the timer may be located at a Serving GPRS Support Node (SGSN). A GPRS telecommunications system is a standardized switched data service for GSM based systems and networks.

Regardless of the type of telecommunications network utilized, such timers must currently be set manually. Correct timer settings are very important from a network-load point of view. A wrong setting may result in a serious overload in the network, particularly following a long network shutdown. The timers present at the mobile stations may additionally expire at an inopportune moment, causing a network overload and massive access requests for location updates. A setting that is too short may result in excessive signaling due to the generation of unnecessary location updates. A longer setting may result in inaccurate location identification for the mobile stations, which in turn promotes excess paging. An excess number of pagings may also contribute to an increase in the network load. Such excess pagings are usually unsuccessful. The timer settings themselves will vary according to the type of network utilized, the type of cells planned, coverage area, and so forth.

From the foregoing, it can be appreciated that a need exists for a reliable method and system for the automatic evaluation and implementation of timer settings in telecommunication networks. Such a method and system, if implemented, would serve to promote accurate and efficient periodic Location Update and Periodic Routing Area timers in GSM and GPRS systems, which would in turn create less havoc and frustration in telecommunication networks, as is the case with current timer configurations.

SUMMARY OF THE INVENTION

It is therefore one object of the present invention to provide an improved telecommunications network.

It is another object of the present invention to provide an improved cellular telephone network.

It is still another object of the present invention to provide a method and system for periodically notifying a telecommunications network of the availability of mobile stations within the telecommunications network.

It is yet another object of the present invention to provide a method and system for automatically notifying a telecommunications network of the availability of mobile stations within the telecommunications network.

The above and other objects are achieved as is now described. A method and system in a telecommunications network for dynamically updating data indicative of the availability of mobile stations within the telecommunications network is disclosed. Periodically, a total number of mobile location updates and a total number of failed pagings occurring within the telecommunications network during a prior time interval are ascertained. Thereafter, a ratio of the total number of mobile location updates to the total number of failed pagings is determined, in response to ascertaining the total number of mobile location updates and the total number of successful paging occurring within the prior time interval.

A threshold value is designated such that the threshold value is determinative of whether or not to release to the telecommunications network, data indicative of the availability of mobile stations within the telecommunications network. At a particular time, the data is automatically released, in response to ascertaining whether the ratio falls within an appropriate range of the threshold value. The use of the threshold value to assist in determining whether or not to release the data to the telecommunications network at a particular time, promotes the dynamic release of the data to the telecommunications network without the necessity of manual intervention.

If the ratio is found to be greater than a specified upper limit of the threshold value, the particular time is decreased. If, however, the ratio is found to be less than a specified lower limit of the threshold value, the particular time is increased. The threshold value itself is dependent upon the total number of mobile switching centers present within the telecommunications network.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
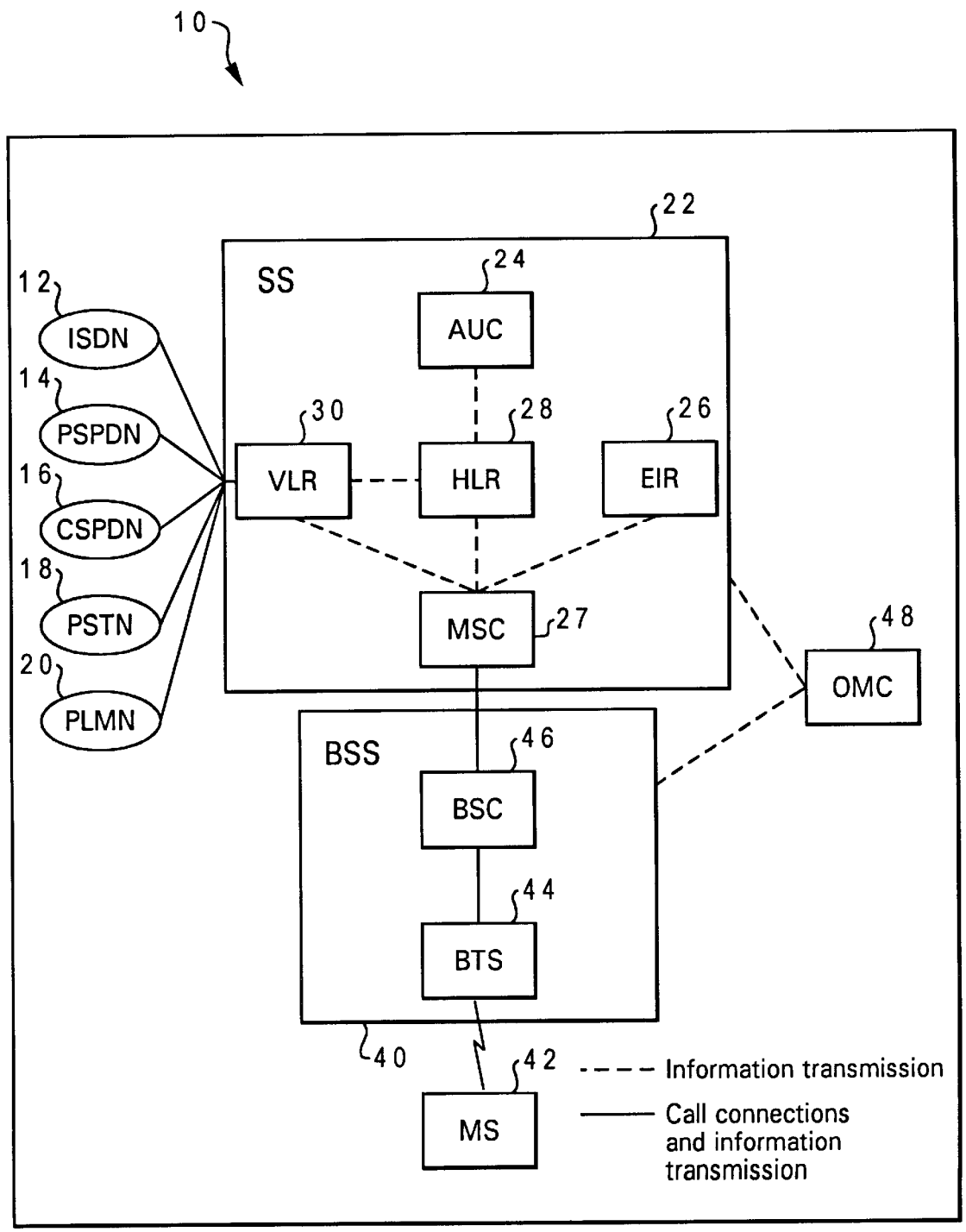
FIG. 1 depicts a block diagram illustrative of a telecommunications network in which a preferred embodiment of the present invention may be implemented.

Reference is now made to FIG. 1, wherein a block diagram illustrates a telecommunications network 10 in which a preferred embodiment of the present invention may be implemented. Telecommunications network 10 depicted in FIG. 1 is divided into a Switching System (SS) 22 and a Base Station System (BSS) 40. Each of these systems contains a number of functional units, which process information and carry out operations of a functional telecommunications network. The functional units themselves may be implemented utilizing various telecommunications hardware devices.

Switching System (SS) 22 is composed of a Visitor Location Register (VLR) 30, a Home Location Register (HLR) 28, an Authentication Center (AUC) 24, an Equipment Identity Register (EIR) 26, and a Mobile Switching Center (MSC) 27. Base Station System (BSS) 40 is composed of a Base Station Controller (BSC) 46 and a Base Transceiver Station (BTS) 44. An Operations and Maintenance Center (OMC) 48 is connected to equipment present within Switching System (SS) 22 and to BSC 46. The dashed lines in FIG. 1 represent information transmission, while solid lines represent both call connections and information transmission.

Telecommunications network 10 illustrated in FIG. 1 may be realized as a network of neighboring radio cells, which together provide complete coverage for a service area. The service area is the geographic area served by a given telecommunications supplier, and is the area in which the supplier stands ready to provide its service. The service area of New York Telephone, for example, is most (but not all) of New York State. Each cell contains a base station transceiver (BTS) operating on a set of radio channels. These channels differ from the channels utilized by neighboring cells in order to avoid interference.

Each base station controller (BSC) controls a group of base station transceivers. The base station controller controls well-known telecommunication functions, such as "Handover" and power control. A number of base station controllers (e.g., BSC 46) are served by a mobile switching center (MSC) 27, which controls calls to and from a Public Switched Telephone Network (PSTN) 18. MSC 27 also controls calls to and from an Integrated Services Digital Network (ISDN) 12, a Public Land Mobile Network (PLMN) 20, a Circuit Switched Public Data Network (CSPDN) 16, and also, various private networks such as, for example, a Packet Switched Public Data Network (PSPDN) 14.

Each unit is actively involved in carrying speech connections between Mobile Station (MS) 42 and, for example, a subscriber in a fixed network, such as PSTN 18. Because of the extreme difficulties involved in completing an MS terminated telephone call, a number of databases located within the telecommunications network keep track of Mobile Station (MS) 42. The most important of these databases is Home Location Register (HLR) 28. When a user subscribes to a telecommunications network, such as the telecommunications network depicted in FIG. 1, the user is registered within Home Location Register (HLR) 28. Home Location Register (HLR) 28 contains subscriber information, such as supplementary services and authentication parameters.

Data describing the location of the MS, such as the area (i.e., the MSC area) in which the MS presently resides, is contained within the Home Location Register (HLR) 28. The MSC area represents that portion of the telecommunications network covered by a single MSC. In order to route a call to a mobile subscriber within a telecommunications network, such as the telecommunications network depicted in FIG. 1, the path through the network links to the MSC in the MSC area where the subscriber is currently located. Data describing the location of the MS is thus actively altered as the MS moves from cell to cell within the telecommunications network. MS 42 sends location information, via MSC 27 and Visitor Location Register (VLR) 30, to an associated HLR, which permits MS 42 to receive calls. The Authentication Center (AUC) 24 is connected to Home Location Register (HLR) 28, and provides Home Location Register (HLR) 28 with authentication parameters and ciphering keys utilized for security purposes.

Visitor Location Register (VLR) 30 is a database that contains information regarding all mobile stations currently located in the MSC area. When MS 42 roams in a new MSC area, the VLR connected to the MSC in that particular area requests data about the MS from Home Location Register (HLR) 28. Simultaneously, Home Location Register (HLR) 28 is provided with the location of the MSC area in which MS 42 resides. If it is later desired to make a call from MS 42, Visitor Location Register (VLR) 30 will have at its disposal, all the information necessary for call set-up, without being forced to interrogate Home Location Register (HLR) 28 each time a call is made. Visitor Location Register (VLR) 30 thus functions as a distributed HLR. Visitor Location Register (VLR) 30 also contains precise information about the location of the MS in the MSC area.

If an individual subscriber within the fixed network PSTN 18 desires to make a call to a GSM subscriber, an exchange within PSTN 18 connects the call to an MSC equipped with a function commonly known as a "gateway" function. In the telecommunications arts, an MSC having a "gateway" function is commonly referred to as a Gateway MSC (GMSC). The MSC in telecommunications network 10 of FIG. 1 may be implemented as a Gateway MSC. Most MSC's within GSM telecommunications networks function as Gateway MSC's. The GMSC must find the location of the searched MS, which can be accomplished by interrogating the HLR where the MS is registered. The HLR then replies with the address of the current MSC area. Thereafter, the GMSC can re-route the call to the correct MSC. When the call reaches that MSC, the VLR will have additional information regarding the precise location of the MS. The call can then be switched through to completion.

The telecommunications network depicted in FIG. 1 may be implemented as a GSM-type network. Those skilled in the art can appreciate that although the present invention is described and illustrated in the context of a GSM network standard, the present invention may also be implemented in accordance with other standards and networks, including those utilized throughout North and South America. The GSM network standard, as discussed herein, is merely presented for illustrative purposes only and is not a limiting feature of the present invention.

Figure 2:
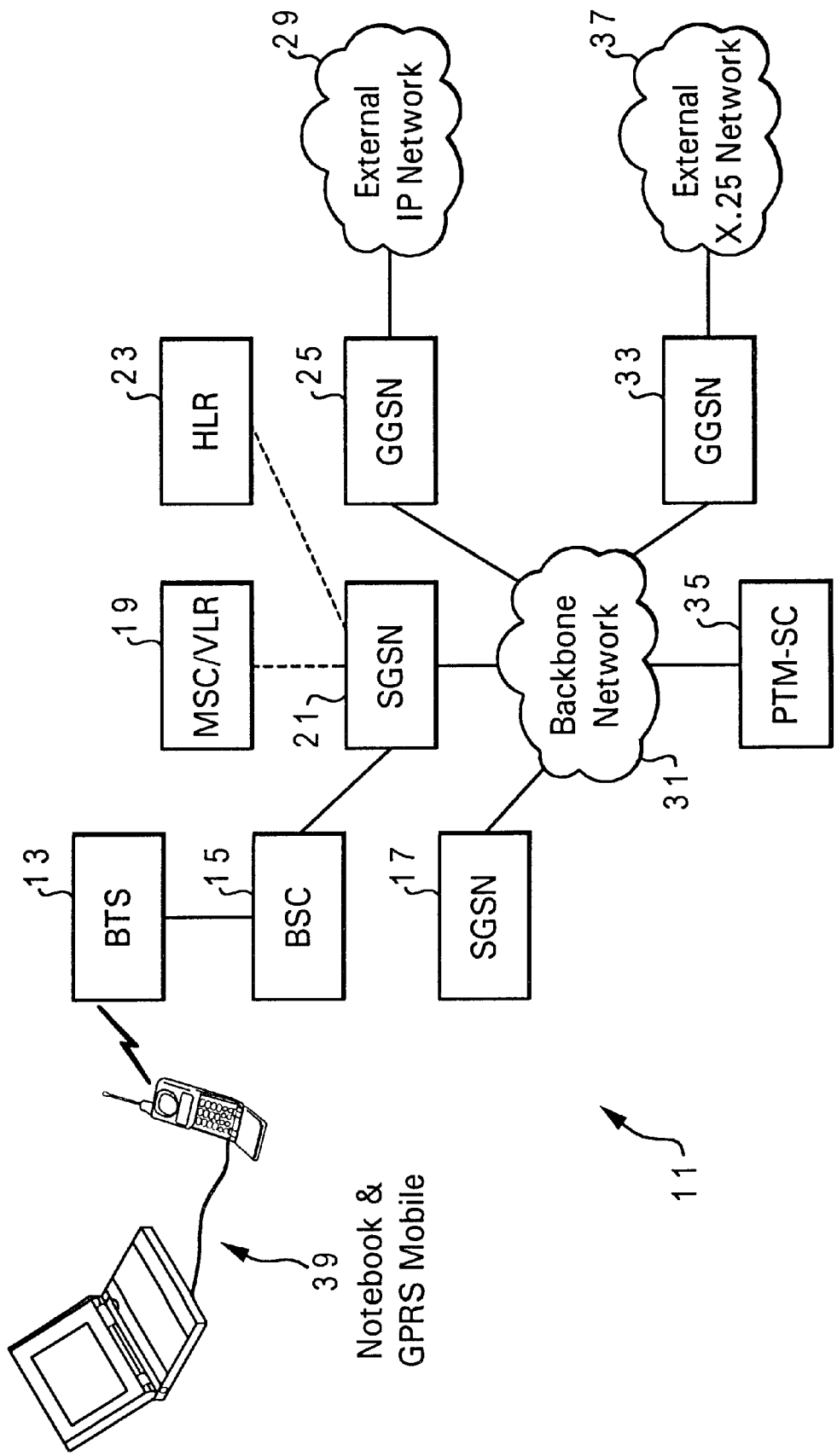
FIG. 2 illustrates a block diagram illustrative of a GPRS telecommunications network, in accordance with a preferred embodiment of the present invention.

FIG. 2 illustrates a block diagram illustrative of a GPRS telecommunications network 11, in accordance with a preferred embodiment of the present invention. Those skilled in the art will appreciate that the method and system described herein may be implemented within the context of a GPRS telecommunications network. Thus, the GPRS telecommunications network depicted in FIG. 2 adds packet switching functionality to the GSM telecommunications network illustrated in FIG. 1. Data packets sent through GPRS telecommunications network 11 may be transmitted at transmission rates of up 115 kbits/s. The GPRS architecture utilizes existing GSM nodes and adds new nodes for handling packet switching, point to multi-point service handling, and interworking of existing packet data networks.

GPRS telecommunications network 11 includes a Base Transceiver Station (BTS) 13, which is linked to a Base Station Controller (BSC) 15. Base Transceiver Station (BTS) 13 is analogous to Base Transceiver Station (BTS) 44 of FIG. 1. Base Station Controller (BSC) 15 is analogous to a Base Station Controller (BSC) 46 of FIG. 1. GPRS telecommunications network 11 also is composed of a Backbone Network 31 linked to a first Serving GPRS Support Node (SGSN) 21, a second Serving GPRS Support Node (SGSN) 21, a first Gateway GPRS Support Node (GGSN) 25, a second Gateway GPRS Support Node 33, and a Point-to-Multipoint Service Center (PTM-SC) 35.

GPRS telecommunications network 11 further includes a Mobile Switching Center/Visitor Location Register (MSC/VLR) 19, which functions as an interface between an MSC and SGSN. MSC/VLR 19 coordinates signaling for mobile stations that have both circuit-switched and packed-switched capabilities. In addition, GPRS telecommunications network 11 includes a Home Location Register (HLR) 23, which is analogous to Home Location Register (HLR) 28 of FIG. 1. Home Location Register (HLR) 23 contains subscription data and routing information. Home Location Register (HLR) 23 also maps each subscriber to one or more Gateway GPRS Support Nodes. Home Location Register (HLR) 23 is accessible from Gateway GPRS Support Node (SGSN) 21.

Wireless devices, such as a Notebook & GPRS Mobile unit 39 may be utilized in association with GPRS Telecommunications Network 11. Portable computers, such as "laptops," "palm-tops," and so forth that run standard operating systems may be utilized in accordance with a preferred embodiment of the present invention. Other wireless devices that are suitable for GPRS services include so-called "smart phones," "card phones," and standard mobile phones. In addition, an External Internet Protocol (IP) Network 29 may be linked to telecommunications network 11 via Gateway GPRS Support Node (GGSN) 25. An External X.25 Network may also be linked to telecommunications network 11 via Gateway GPRS Support Node 33. The GGSN provides the interface towards external IP packet networks and X.25 networks, both well-known networks utilized in the telecommunications arts.

Figure 3:
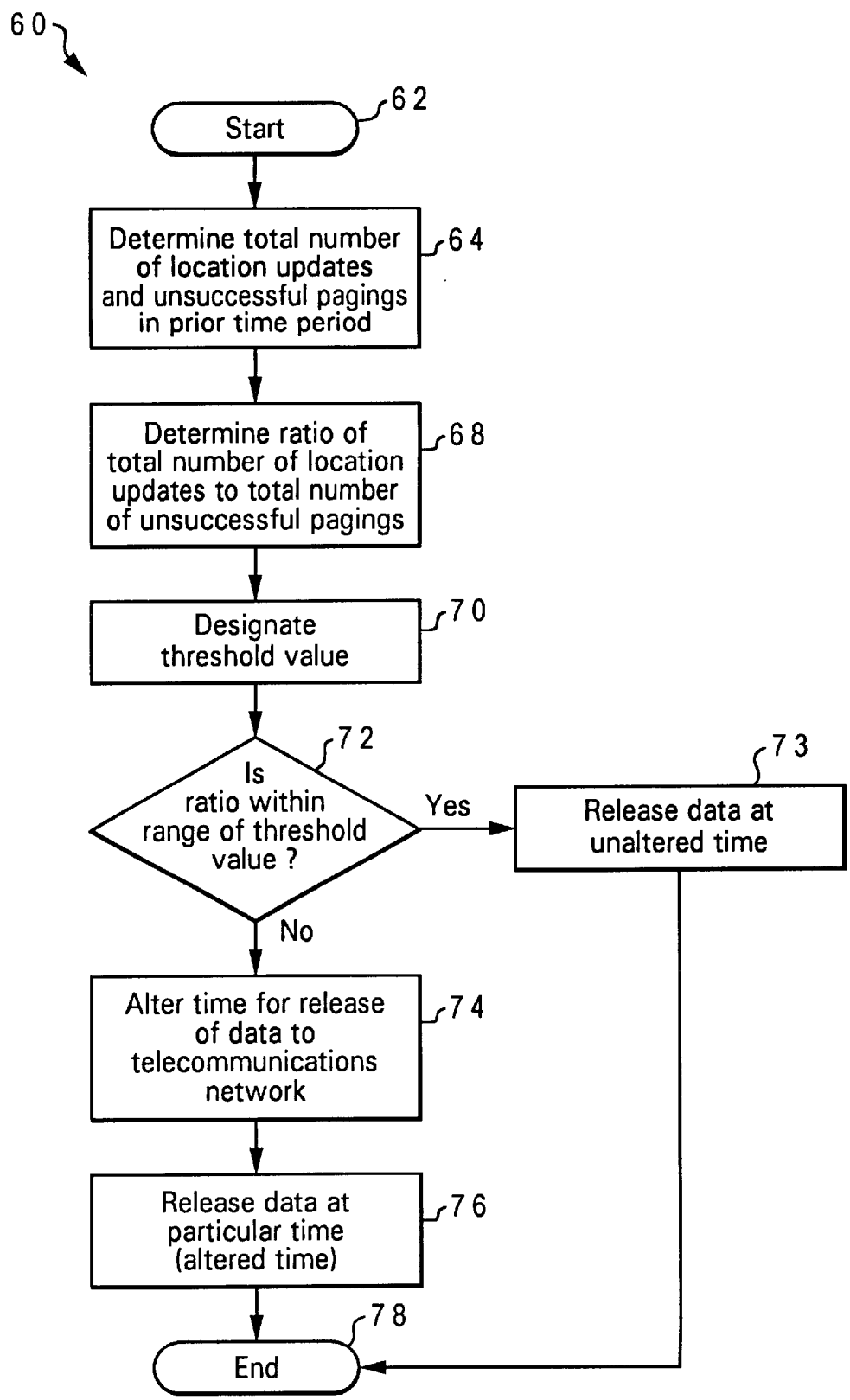
FIG. 3 depicts a high-level logic flow diagram illustrating process steps for implementing the method and system of the present invention, in accordance with a preferred embodiment of the present invention.

FIG. 3 illustrates a high-level logic flow diagram 60 illustrating process steps for implementing the method and system of the present invention, in accordance with a preferred embodiment of the present invention. It can be appreciated by those skilled in the art that FIG. 3, FIG. 4, and FIG. 5, as illustrated and described herein, present a self-consistent sequence of steps leading to a desired result. The steps are those requiring the physical manipulation of physical quantities. Usually, although not necessarily, these quantities take the form of electrical or magnetic signals capable of being stored, transferred, combined, compared, and otherwise manipulated.

It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as "designating," "delivering" or "conveying", which are commonly associated with mental operations performed by a human operator. No such capability of a human operator is necessary or desirable in most cases of the operations described herein, which form part of the present invention. As indicated herein, these operations are primarily machine operations. Useful machines for performing operations of a preferred embodiment of the present invention include data-processing systems, such as a general-purpose digital computer or other similar devices. In all cases the distinction between the method of operations in operating a computer and the method of computation itself should be borne in mind.

The present invention relates to method steps for processing electrical or other (e.g. mechanical, chemical) physical signals to generate other desired physical signals, and can be implemented via a computer or microcomputer. However, it is not necessary to maintain within a computer memory of a mobile telephone subscriber unit, instructions implementing these method steps. Such instructions can be maintained within a computer memory location of a wireless telephone base station or at a central broadcasting center from which such base stations receive instructions. Implementation of the method described herein is left to the discretion of a particular wireless telephone system designer, whether cellular-based or otherwise.

Figure 4:
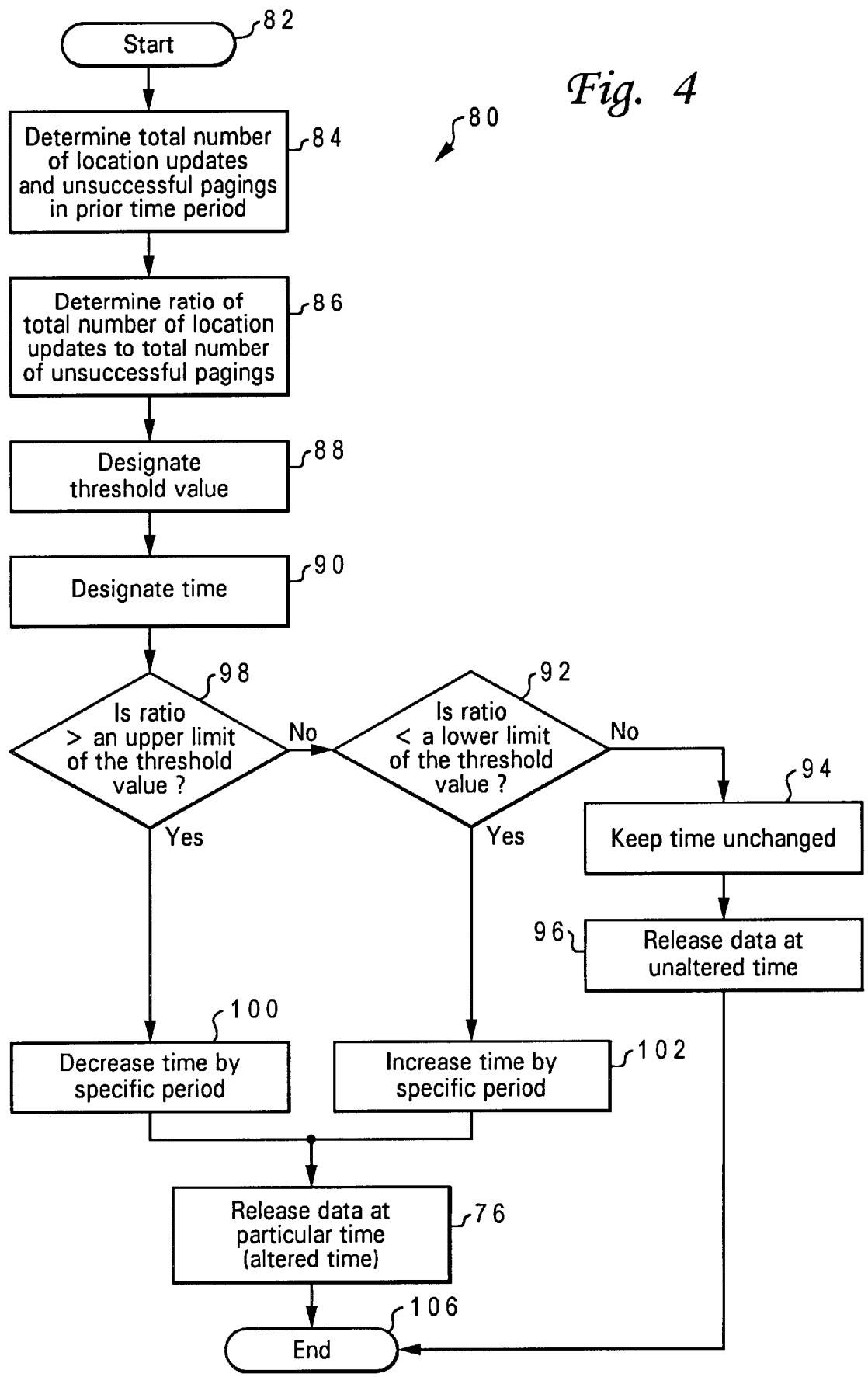
FIG. 4 illustrates a detailed logic flow diagram illustrating process steps for implementing the method and system of the present invention, in accordance with a preferred embodiment of the present invention.
Figure 5:
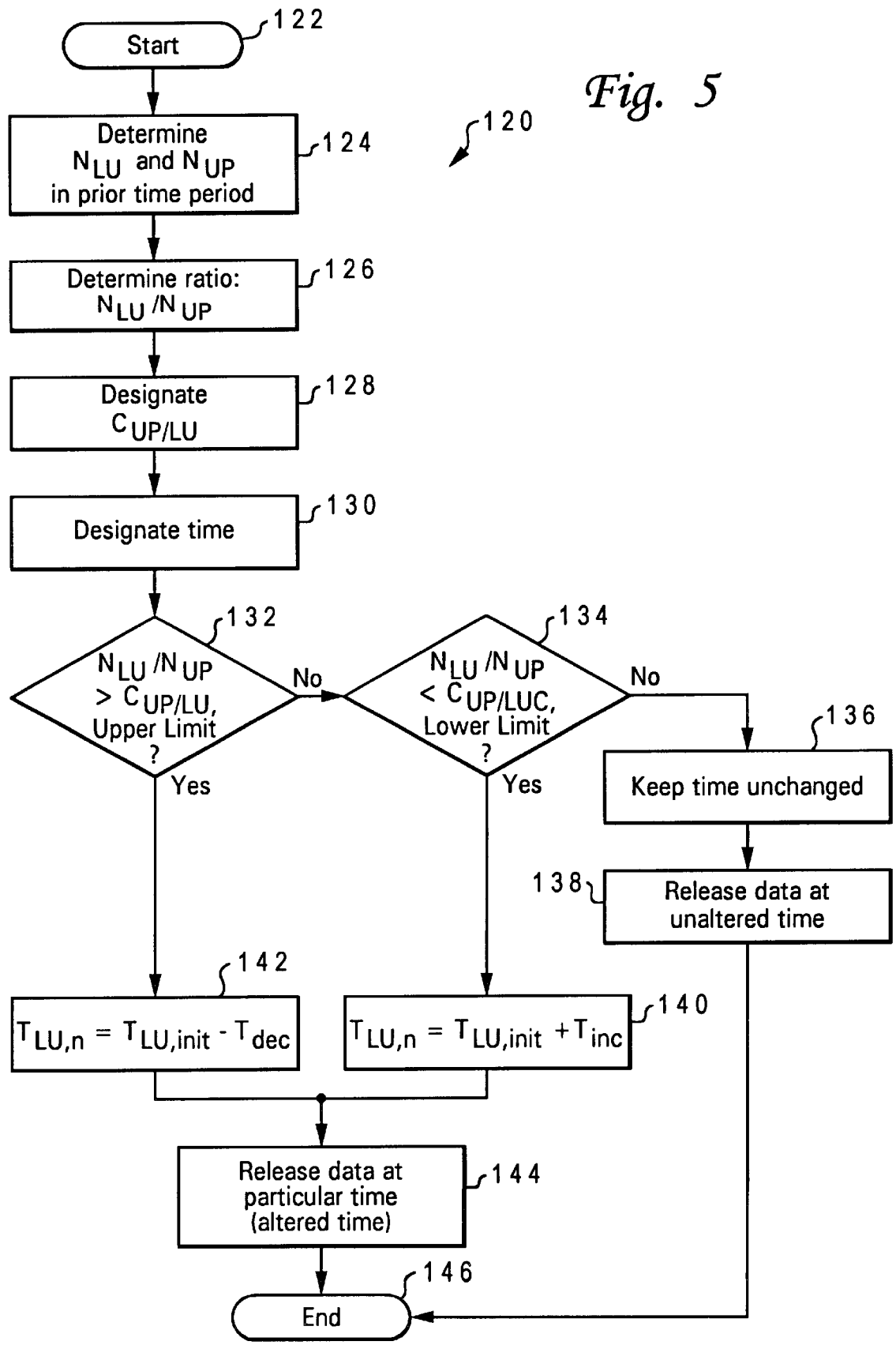
FIG. 5 depicts a detailed mathematical logic flow diagram illustrating process steps for implementing the method and system of the present invention, in accordance with a preferred embodiment of the present invention.

It can be appreciated by those skilled in the art that the methods described herein can be implemented as a program product (e.g., a control program residing in a computer memory) containing instructions that when executed on a CPU, carry out the operations depicted in the logic flow diagrams of FIG. 3, FIG. 4, and FIG. 5. While the present invention is described in the context of a fully functional computer system, those skilled in the art will further appreciate that the present invention is capable of being distributed as a program product in a variety of forms, and that the present invention applies equally, regardless of the particular type of signal-bearing media utilized to actually carry out the distribution. Examples of signal-bearing media include recordable-type media, such as floppy disks, hard-disk drives and CD ROM's, and transmission-type media, such as digital and analog communication links.

Preferred implementations of the invention can include implementations to execute the method or methods described herein as a program product residing in a memory of microcomputer. Alternatively, a preferred embodiment of the present invention can include a program product residing in a microcomputer memory located at an MSC (e.g., MSC 27 of FIG. 1 herein). The MSC controls system operations in cellular telephone networks, thereby managing calls, tracking billing information, and locating cellular subscribers. The program product thus includes sets of instructions for executing the method and system described herein. Until required by a microcomputer, the set of instructions may be stored as a computer-program product in another computer memory. For example, the set of instructions may be stored as a computer-program product in a disk drive attached to a microcomputer (which may include a removable memory such as an optical disk or floppy disk for eventual use in the disk drive).

The computer-program product can also be stored at another computer and transmitted, when desired, to a user's workstation by an internal or external network. Those skilled in the art will appreciate that the physical storage of the sets of instructions physically changes the medium upon which it is stored so that the medium carries computer-readable information. The change may be electrical, magnetic, chemical, or some other physical change. While it is convenient to describe the invention in terms of instructions, symbols, characters, or the like, the reader should remember that all of these and similar terms should be associated with the appropriate physical elements.

Thus, as depicted at block 62, the process for implementing the present invention is initiated. As indicated at block 64, the total number of location updates and unsuccessful pagings that occurred in a telecommunications network (e.g., such as the telecommunications network depicted in FIG. 1) during a previous time period are determined. This time period will likely have occurred immediately prior to the processing of the operation depicted at block 64. However, the time period may have occurred earlier. The choice of which time period to analyze is left up to the designer of a telecommunications network in which the present invention is implemented.

Thereafter, as indicated at block 68, the ratio of the total number of location updates to the total number of unsuccessful pagings is determined. A threshold value is designated, as illustrated at block 70. This threshold value can later be utilized to compare to the ratio value determined earlier (i.e., see block 68). As illustrated thereafter at block 72, a test is performed to determine if the ratio falls within a desired range of the threshold value.

If it is determined, as depicted at block 72, that the ratio does not lie within a desired range of the threshold value, then as illustrated at block 74, the time for releasing data describing the availability of mobile stations within the telecommunications network is altered. Thereafter, as indicated at block 76, the data is released to the telecommunications network at the altered time. The process then terminates, as illustrated at block 78. If, however, it is determined according the operation depicted at block 72, that the ratio does fall within the desired range of the threshold value, the data is simply released to the telecommunications network at the unaltered or originally set time, as illustrated at block 73. The process thereafter terminates, as illustrated at block 78.

FIG. 4 depicts a detailed logic flow diagram 80 illustrating process steps for implementing the method and system of the present invention, in accordance with a preferred embodiment of the present invention. Thus, as depicted at block 82, a detailed process for implementing the present invention is initiated. As indicated at block 84, the total number of location updates and unsuccessful pagings that occurred in a telecommunications network (e.g., such as the telecommunications network depicted in FIG. 1) during a previous time period are determined. This time period will likely have occurred immediately prior to the processing of the operation depicted at block 84. However, the time period may have occurred even earlier. Again, the choice of which time period to analyze and utilize as a parameter in accordance with a preferred embodiment of the present invention may be left to the discretion of the network designer.

Thereafter, as indicated at block 86, the ratio of the total number of location updates to the total number of unsuccessful pagings is determined. A threshold value is designated, as illustrated at block 88, which can later be utilized to compare to the ratio value determined earlier, as described at block 86. This threshold value, although depicted at block 88 following processing of the operation depicted at block 86, may be designated prior to the processing of any of the previous steps. However, for illustrative purposes only, the threshold value is determined, as indicated at block 88. The threshold value is a specified limit dependent upon processing time, and/or radio or terrestrial resources required to perform paging and location updates within various GSM nodes (e.g., MSC and associated interfaces) operating in the telecommunications network.

As illustrated thereafter at block go, a time parameter to release data relating to the availability of mobile stations within the telecommunications network is determined. At this particular time, this data will be released to telecommunications network. Then, as indicated at block 98, a test is performed to determine if the ratio determined earlier is greater than an upper limit of the threshold value. If the ratio is greater than an upper limit of the threshold value, then as described at block 100, the time designated earlier (i.e., see block 90) is decreased by a specified period. Thereafter, the data is released to the telecommunications network at this altered time, as depicted at block 104. The telecommunications network will then have at its disposal, data relating to the availability of mobile stations within the network.

If, however, the ratio is not greater than an upper limit of the threshold value, an additional test is performed, as illustrated at block 92, to determine if the ratio is less than a lower limit of the threshold value. If the ratio is less than a lower limit of the threshold value, then as indicated at block 102, the time designated earlier, as described at block go, is increased by a specified period. The data is then released, as depicted at block 104, at the newly altered time. The process then terminates, as depicted at block 106. If the ratio is not greater than a lower limit of the threshold value, the time remains unchanged, as illustrated at block 94, and the data is released to the telecommunications network at the time determined originally, as described at block 90. The process then terminates, as indicated at block 106.

FIG. 5 depicts a detailed mathematical logic flow diagram 120 illustrating process steps for implementing the method and system of the present invention, in accordance with a preferred embodiment of the present invention. As indicated at block 122, the process is initiated. As illustrated at block 124, the number of location updates and unsuccessful pagings having occurred in a prior time period are determined. The total number of location updates occurring in the prior time period is represented by the value $N_{LU}$.

The total number of unsuccessful pagings occurring in the prior time period is represented by the value $N_{UP}$. The ratio of the total number of location updates to the total number of unsuccessful pagings is represented by the value $N_{LU}/N_{UP}$, as depicted at block 126. Thereafter, as illustrated at block 128, a specified value (i.e., a threshold value) is designated. This specified value is represented by the variable $C_{UP/LU}$. Ideally, the ratio should be kept as close as possible to the specified value. Thereafter, as indicated at block 130, the time at which the data (i.e., data indicative of the availability of mobile stations within the telecommunications network) will released to the telecommunications network is designated.

This time the parameter is represented by the variable $T_{LU,init}$. Blocks 122 to 130 can be described as operations in which measures are performed and paging and location update statistics are collected. Thereafter, as depicted at block 132 a test is performed to determine if the ratio $N_{LU}/N_{UP}$ is greater than an upper limit of $C_{UP/LU}$. If it is determined that $N_{LU}/N_{UP}$ is greater than the upper limit of $C_{UP/LU}$, then the designated time (i.e., see block 130) at which data is to be released to the telecommunications network is decreased by a specified time period, represented by the variable $T_{dec}$. Mathematically, the operation illustrated at block 142, which is analogous to the operation illustrated at block 100 of FIG. 4, can be described by the following mathematical formula:

$$T_{LU,n} = T_{LU,init} - T_{dec}$$

If it is determined that $N_{LU}/N_{UP}$ is not greater than the upper limit of $C_{UP/LU}$, then a test is performed to determine if $N_{LU}/N_{UP}$ is less than a lower limit of $C_{UP/LU}$. If it is determined that $N_{LU}/N_{UP}$ is less than a lower limit of $C_{UP/LU}$, then as indicated at block 140, then the designated time is increased by a specified time period parameter. Mathematically, the operation illustrated at block 140, which is analogous to the operation depicted at block 102 of FIG. 4, can be described by the following mathematical formula:

$$T_{LU,n} = T_{LU,init} + T_{dec}$$

If it is determined that $N_{LU}/N_{UP}$ is not less than the lower limit of $C_{UP/LU}$, then as depicted at block 136, the time remains unchanged. As illustrated at block 138, the data is then released to the telecommunications network at the originally designated time (i.e., see block 130). The process then terminates, as described at block 146.

The embodiments and examples set forth herein are presented in order to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method in a telecommunications network for dynamically updating data indicative of the availability of mobile stations within said telecommunications network, said method comprising the steps of:

periodically ascertaining a total number of mobile location updates and a total number of failed pagings occurring within said telecommunications network during a prior time interval;

determining a ratio of said total number of mobile location updates to said total number of failed pagings, in response to ascertaining said total number of mobile location updates and said total number of successful paging occurring within said prior time interval;

designating a threshold value determinative of whether to release to said telecommunications network, data indicative of the availability of mobile stations within said telecommunications network; and automatically releasing said data to said telecommunication network at a particular time, in response to ascertaining whether said ratio falls within an appropriate range of said threshold value, thereby promoting the dynamic release of said data to said telecommunications network.

2. The method of claim 1 further comprising the step of:

decreasing said particular time, if said ratio is greater than a specified upper limit of said threshold value.

3. The method of claim 2 further comprising the step of:

increasing said particular time, if said ratio is less than a specified lower limit of said threshold value.

4. The method of claim 3 wherein the step of designating a threshold value determinative of whether to release to said telecommunications network, data indicative of the availability of mobile stations within said telecommunications network, further comprises the step of:

designating a threshold value determinative of whether to release to said telecommunications network, data indicative of the availability of mobile stations within said telecommunications network, wherein said threshold value is dependent upon a total number of mobile switching centers present within said telecommunications network.

5. The method of claim 4 wherein the step of periodically ascertaining a total number of mobile location updates and a total number of failed pagings occurring within said telecommunications network during a prior time interval, further comprises the step of:

periodically ascertaining a total number of mobile location updates and a total number of failed pagings occurring within said telecommunications network during a prior time interval, wherein said total number of mobile location updates comprises a total number of mobile switching center updates occurring within said telecommunications network during said prior time interval.

6. The method of claim 5 wherein the step of periodically ascertaining a total number of mobile location updates and a total number of failed pagings occurring within said telecommunications network during a prior time interval, further comprises the step of:

periodically ascertaining a total number of mobile location updates and a total number of failed pagings occurring within said telecommunications network during a prior time interval, wherein said telecommunications network comprises a wireless telecommunications network.

7. The method of claim 6 wherein the step of periodically ascertaining a total number of mobile location updates and a total number of failed pagings occurring within said telecommunications network during a prior time interval, further comprises the step of:

periodically ascertaining a total number of mobile location updates and a total number of failed pagings occurring within said telecommunications network during a prior time interval, wherein said telecommunications network comprises a cellular telephone network.

8. The method of claim 6 wherein the step of periodically ascertaining a total number of mobile location updates and a total number of failed pagings occurring within said telecommunications network during a prior time interval, further comprises the step of:

automatically periodically ascertaining a total number of mobile location updates and a total number of failed pagings occurring within said telecommunications network during a prior time interval.

9. A system in a telecommunications network for dynamically updating data indicative of the availability of mobile stations within said telecommunications network, said system comprising:

means for periodically ascertaining a total number of mobile location updates and a total number of failed pagings occurring within said telecommunications network during a prior time interval;

means for determining a ratio of said total number of mobile location updates to said total number of failed pagings, in response to ascertaining said total number of mobile location updates and said total number of successful paging occurring within said prior time interval;

means for designating a threshold value determinative of whether to release to said telecommunications network, data indicative of the availability of mobile stations within said telecommunications network; and means for automatically releasing said data to said telecommunication network at a particular time, in response to ascertaining whether said ratio falls within an appropriate range of said threshold value, thereby promoting the dynamic release of said data to said telecommunications network.

10. The system of claim 9 further comprising:

means for decreasing said particular time, if said ratio is greater than a specified upper limit of said threshold value.

11. The system of claim 10 further comprising:

means for increasing said particular time, if said ratio is less than a specified lower limit of said threshold value.

12. The system of claim 11 wherein said threshold value is dependent upon a total number of mobile switching centers present within said telecommunications network.

13. The system of claim 12 wherein said total number of mobile location updates comprises a total number of mobile switching center updates occurring within said telecommunications network during said prior time interval.

14. The system of claim 13 wherein said telecommunications network comprises a wireless telecommunications network.

15. The system of claim 14 wherein said telecommunications network comprises a cellular telephone network.

16. The system of claim 15 wherein said means for periodically ascertaining a total number of mobile location updates and a total number of failed pagings occurring within said telecommunications network during a prior time interval, further comprises:

means for automatically periodically ascertaining a total number of mobile location updates and a total number of failed pagings occurring within said telecommunications network during a prior time interval.

17. A program product residing in computer memory in a computer for dynamically updating data indicative of the availability of mobile stations within a telecommunications network, said program product comprising:

instruction means residing in a computer for periodically ascertaining a total number of mobile location updates and a total number of failed pagings occurring within said telecommunications network during a prior time interval;

instruction means residing in a computer for determining a ratio of said total number of mobile location updates to said total number of failed pagings, in response to ascertaining said total number of mobile location updates and said total number of successful paging occurring within said prior time interval;

instruction means residing in a computer for designating a threshold value determinative of whether to release to said telecommunications network, data indicative of the availability of mobile stations within said telecommunications network; and instruction means residing in a computer for automatically releasing said data to said telecommunication network at a particular time, in response to ascertaining whether said ratio falls within an appropriate range of said threshold value, thereby promoting the dynamic release of said data to said telecommunications network.

18. The program product of claim 17 further comprising:

instruction means residing in a computer for decreasing said particular time, if said ratio is greater than a specified upper limit of said threshold value.

19. The program product of claim 18 further comprising:

instruction means residing in a computer for increasing said particular time, if said ratio is less than a specified lower limit of said threshold value.

20. The program product of claim 19 wherein said threshold value is dependent upon a total number of mobile switching centers present within said telecommunications network.

21. The program product of claim 20 wherein said total number of mobile location updates comprises a total number of mobile switching center updates occurring within said telecommunications network during said prior time interval.

22. The program product of claim 21 wherein said telecommunications network comprises a wireless telecommunications network.

23. The program product of claim 22 wherein said telecommunications network comprises a cellular telephone network.

24. The program product of claim 23 wherein said instruction means residing in a computer for periodically ascertaining a total number of mobile location updates and a total number of failed pagings occurring within said telecommunications network during a prior time interval, further comprises:

instruction means residing in a computer for automatically periodically ascertaining a total number of mobile location updates and a total number of failed pagings occurring within said telecommunications network during a prior time interval.

* * * * *